United States Patent Office 3,118,814
Patented Jan. 21, 1964

3,118,814
6,16-DIMETHYL-15-DEHYDRO STEROIDS
Fritz von Werder and Klaus Brückner, Darmstadt, Karl-Heinz Bork, Griesheim, near Darmstadt, and Harald Metz, Darmstadt, Germany, assignors to E. Merck Aktiengesellschaft, Darmstadt, Germany
No Drawing. Filed Nov. 21, 1962, Ser. No. 239,364
Claims priority, application Germany Nov. 24, 1961
18 Claims. (Cl. 167—65)

This invention relates to the preparation and use of 6,16-dimethyl-15-dehydro-steroids, and the $\Delta^1$, $\Delta^6$, and $\Delta^{1,6}$ derivatives thereof.

Steroid chemists are involved in a continuous search for new steroid derivatives, not only for their immediate practical therapeutic use, but also because new steroids can be utilized as intermediates for the synthesis of still other steroids. Hope springs eternal that a now undiscovered steroid derivative will prove to be a panacea for a variety of serious illnesses.

An object of this invention, therefore, is to provide novel steroid derivatives.

Another object is to provide various processes for the synthesis of the steroids of this invention, and to provide novel intermediates therefor.

Still another object is to provide pharmaceutical compositions based on the steroids of this invention.

An additional object is to provide a process for effecting anti-inflammatory activity in mammals by the administration of the steroids of this invention.

Still other objects and advantages of this invention will become apparent upon further study of the specification and appended claims.

The steroids of this invention conform to Formula I, as follows:

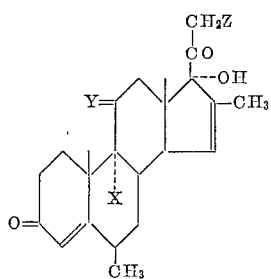

and the $\Delta^1$, $\Delta^6$, and $\Delta^{1,6}$ derivatives thereof, wherein

X represents H or F
Y represents $\alpha H$, $\beta OH$, or $=O$
Z represents a free or an esterified hydroxyl group The following compounds are preferred specific embodiments of this invention:

6α,16-dimethyl-15-dehydro-hydrocortisone
6α,16-dimethyl-15-dehydro-prednisolone
6α,16-dimethyl-15-dehydro-prednisone
6α-16-dimethyl-9α-fluoro-15-dehydro-prednisolone
6α,16-dimethyl-6,15-bisdehydro-hydrocortisone
6α,16-dimethyl-6,15-bisdehydro-prednisolone
6α,16-dimethyl-6,15-bisdehydro-prednisone
6α,16-dimethyl-9α-fluoro-6,15-bisdehydro-prednisolone and the pharmaceutically acceptable 21-esters thereof, such as, for example, the acetates, propionates, tert.butyl-acetates, diethylamino acetates, cyclohexylpropionates, hemisuccinates, hemisulfates and orthophosphates.

These new compounds in admixture with the usual excipients and carriers can be used for the treatment of mammals. Any of the conventional carriers can be used, such as water, oils, polyethylene glycols, gelatine, lactose, starch, magnesium sterate, talcum, petroleum, jelly, cholesterol, etc. For parenteral application, oily or aqueous solutions, suspensions or emulsions in oil or water are suitable. For peroral application, tablets or dragees can be used, and for topical use, cremes or salves, which should either be sterilized or used with ancillary materials such as wetting agents or salts for influencing the osmotic pressure, or buffering materials.

If the end products are to be used in solid prepared form, a unit dosage is about 0.1–10 mg. When used as injection solutions, the unit dosage should be correspondingly about 2–25 mg. In either form, the amount of carrier is not critical, but is preferably about 5 mg.–2 g.

The steroids of this invention may be produced by a series of individually known unit reactions. For example, a suitable starting material is 6,16-dimethyl-16α,17α-oxido-progesterone described in J. Chem. Soc., 1961, p. 2821, from which the compounds represented by Formula I of this invention can be produced by a series of reactions which can follow one another in almost any order.

Thus, the 6,16-dimethyl-16α,17α-oxido-progesterone can be converted into 6,16-dimethyl-15-dehydro-17α-hydroxy-progesterone in a known manner. The 15-dehydro compound thus obtained can then be hydroxylated in the 11th position in a known manner, or can be dehydrogenated in the 1- and/or 6-positions.

The order of these reactions can be changed at will, although generally the 1,2 dehydrogenation is the last reaction that is performed. The conversion of one of the intermediate products into one of the corresponding 21-hydroxy or 21-O-acyl compounds can likewise be accomplished by a suitable reaction, and preferably by means of the corresponding 21-iodo-steroid.

From the 11-hydroxylated products, the corresponding 9α-fluoro derivatives can be produced by known methods. The 11-hydroxyl group can, at any step in the process, be oxidized by known methods to the corresponding 11-keto compound. Furthermore, the 21-acyl groups in the final products can be saponified by known methods, or conversely, the 21-hydroxyl groups can be esterified by any of the usual methods.

The separate steps are performed as follows:

(a) SPLITTING OPEN OF THE 16α,17α EPOXIDE

This cleavage is accomplished by treatment of the 16β-methyl-16α,17α-oxido steroid with an acid in the presence of water and a water-miscible solvent. Suitable acids are perchloric, hydrochloric, hydrobromic, hydrofluoric, sulfuric, and other strong acids. As the water-miscible solvent, acetone, tetrahydrofuran, methanol, ethanol, acetonitrile, dimethylformamide, dioxane and glacial acetic acid are operable. The cleavage reaction should be conducted somewhere between 0° C. and 100° C. The reaction usually takes from 30 minutes to 24 hours, depending on which starting material, which acid, and which solvent is used. In many cases, it is sufficient just to let the reaction mixture stand at room temperature.

(b) 11-HYDROXYLATION

The 11-hydroxylation is accomplished with microorganisms. Any of the species that are usually employed for such purposes can be used. Microorganisms especially suitable for 11β-hydroxylation are fungi of the species Absidia, Coniothyrium, Cunninghamella, Curvularia, Mucor, Stachylidium and Streptomyces.

For the 11α-hydroxylation, suitable species of microorganisms are Absidia, Aspergillus, Coryneum, Fusarium, Glomerella, Metarrhizium, Mucor (and other species of the Mucorales order), Penicillium, and Rhizopus.

The fermentation is conducted in the customary manner and requires 10 to 48 hours. The 11-hydroxy-steroid thus produced is extracted from the reaction mixture by means of chloroform or methylene chloride.

(c) DEHYDROGENATION

The 1-dehydrogenation can be accomplished either chemically or microbiologically and at any desired stage of the process. For chemical dehydrogenation, a suitable reagent is for example 2,3-dichloro-5,6-dicyano-benzoquinone. The reaction is preferably conducted in the presence of a solvent having a boiling point between about 30 and 150° C. Suitable solvents are ethanol, butanol, tertiary butanol, tertiary butylacetic methyl ester, methyl acetate, dioxane, acetic acid, benzene, tetrahydrofuran, acetone, etc. It is advantageous to add a small amount of nitrobenzene to the reaction mixture. The reaction requires 5 to 48 hours, and is preferably conducted at the boiling temperature of the solvent.

For microbiological 1,2-dehydrogenation, microorganisms of the following species can be used—Alternaria, Calonectria, Collectotrichum, Cylindrocarpon, Didymella, Fusarium, Ophiobolus, Septomyca, Vermicularia; Micromonospora, Nocardia, Streptomyces; Alcaligenes, Bacillus, Corynebacterium, Mycobacterium, Protaminobacter, Pseudomonas. Especially suitable are *Bacillus sphaericus* var. *fusiformis*, *Corynebacterium simplex* and *Fusarium solani*.

For dehydrogenation the starting material has added to it a submerged culture of the selected microorganism which is grown in a nutrient solution at optimum temperature and strong aeration according to the usual methods of fermentation technology. Instead of growing cultures, suspensions of microorganisms in buffer solutions can be used with the same technique. The conversion is observed by chromatography and after it has been completed, the solution is extracted with chloroform.

(d) 6-DEHYDROGENATION

Dehydrogenation in the 6-position is accomplished with chloranil. It is advantageous to work in the presence of an inert solvent such as benzene, toluene, xylene, chloroform, methylene chloride, acetone, methanol, ethanol, tert.butanol, tetrahydrofuran or glacial acetic acid. The conversion is preferably conducted at a warm temperature, such as the boiling temperature of the solvent. Chloranil is generally used in the molar ratio of 1:1. An excess of it is not detrimental.

(e) 21-ACYLATION

The 21-acylation of a 21-desoxy-steroid can be performed at any desired reaction stage and by any customary method. For example a 21-desoxy-steroid in a tetrahydrofuran/methanol mixture can be converted into the corresponding 21-iodo-steroid by treatment with an alkaliiodine solution, which can then be acylated by means of an alkali acylate, preferably potassium acetate in acetone.

(f) INTRODUCTION OF A 9α-FLUORINE ATOM

This reaction is performed on the corresponding 9,11-dehydrosteroids which can be obtained from the 11-hydroxy-steroids by the usual dehydration. 11β-hydroxysteroids for example can be dehydrated by treatment with phosphorus oxychloride or thionyl chloride in pyridine. 11α-hydroxy-steroids can be most conveniently converted into the 9,11-dehydro-steroids by esterification with p-toluene sulfonic acid and subsequent splitting away of the acid. Subsequent treatment with HOBr or N-bromosuccinimide and alkaline materials such as potassium acetate yields the corresponding 9β,11β-epoxides, which upon reaction with hydrogen fluoride produce the respective 9α-fluoro-11β-hydroxy-steroids. The reaction with hydrogen fluoride occurs preferably in the presence of inert solvents such as chloroform, methylene chloride, tetrahydrofuran or dioxane. The temperature should be between $-70°$ C. and $+15°$ C.

(g) OXIDATION

The 6,16-dimethyl-15-dehydro-steroids which contain an 11-hydroxyl group, and which were obtained as intermediate or end products, can be converted into the corresponding 11-keto-steroids by treatment with a mild oxidizing agent such as chromic acid, a mixture of chromic acid and pyridine, or chromic acid and acetone, or chromosulfuric acid, or hypobromous acid.

(h) SAPONIFICATION

The ester groups in the 21-position which appear in the intermediate or end products can be saponified by the usual methods. Suitable saponifying agents are for example aqueous solutions of sodium bicarbonate, sodium carbonate, or sodium hydroxide, said reaction being preferably conducted in the absence of oxygen.

(i) ESTERIFICATON

The hydroxy groups in the intermediate or end products can be esterified by the usual methods. For this esterification, a wide variety of organic and inorganic acids or the functional acid derivatives thereof can be employed. Thus, reactive derivatives of saturated or unsaturated aliphatic or cycloaliphatic, aromatic or heterocyclic carboxylic acids are suitable, preferably of lower aliphatic, monocyclic cycloaliphatic, aromatic or heterocyclic carboxylic acids, lower monocyclic araliphatic or cycloaliphatic carboxylic acids, such as, for example, these of formic acid, the butyric acids, valeric acids or trimethylacetic acid, the caproic acids such as β-trimethylpropionic acid, the enanthic, caprylic, pelargonic, capric or undecyclic acids, for example, undecylenic acid, the lauric, myristic, palmitic or stearic acids, for example oleic acid, cyclopentyl-, cyclohexyl- or phenylacetic acids or propionic acids, benzoic acid, phenoxyalkanic acids such as phenoxyacetic acid, p-chlorophenoxyacetic acid, 2,4-dichlorophenoxyacetic acid, 4-tertiary butyl-phenoxyacetic acid, 3-phenoxypropionic acid, 4-phenoxybutric acid, furan-2-carboxylic acid, 5-tertiary butyl-furan-2-carboxylic acid, 5-bromofuran-2-carboxylic acid, the nicotinic acids, or also of dicarboxylic acids, such as oxalic, succinic or glutaric acids substituted carboxylic acids, such as β-keto carboxylic acids, for example, the acetoacetic, butyrylacetic or caproylacetic acid, or amino acids and so on. Additionally inorganic acid such as phosphoric and sulfuric can be used. If the steroids are to be administered as pharmaceutical preparations, then it is, of course, important that physiologically compatible esters be used, such as those prepared with pharmaceutically acceptable acids, as for example, taken from the preceding group.

Novel and valuable intermediates that are produced by this process include the following:

6α,16-dimethyl-4,15-pregnadiene-3,20-dione-17α,21-diol and the 21-acetate thereof;

6α,16-dimethyl-4,9(11),15-pregnatriene-3,20-dione-17α-ol;

6,16-dimethyl-4,6,9(11),15-pregnatetraene-3,20-dione-17α,21-diol and the 21-acetate thereof;

6α,16-dimethyl-9β,11β-oxido-4,15-pregnadiene-17α,21-diol-3,20-dione and the 21-acetate thereof;

6,16-dimethyl-9β,11β-oxido-4,6,15-pregnatriene-3,20-dione-17α-ol;

6α,16-dimethyl-4,15-pregnadiene-17α-ol-3,20-dione;

6α,16-dimethyl-4,15-pregnadiene-11α,17α-diol-3,20-dione;

6α,16-dimethyl-4,15-pregnadiene-11β,17α-diol-3,20-dione.

Without further elaboration, it is believed that one skilled in the art can produce the novel compounds of this invention by reference to the preceding description. The following preferred specific embodiments of the process are, therefore, merely exemplary and are not to be considered limitative of the invention in any way whatsoever.

Example 1

[The temperatures are in degrees centigrade]

(a) 10 g. 6α,16β-dimethyl-16α,17α-oxido-4-pregnene- 3,20-dione are mixed with 500 cc. dimethylformamide and 10 cc. concentrated hydrochloric acid and allowed to remain 24 hours at room temperature. The reaction mixture is then poured into water and filtered. The precipitate consists of crude 6α,16-dimethyl-4,15-pregnadiene-17α-ol-3,20-dione.

$\lambda_{max}$. 241 m$\mu$, $E_{1\ cm.}^{1\%}$ 395, melting point 201–205°

(b) In a small fermenter, 15 liters of a nutrient solution of 5% glucose, 0.2% yeast extract, 0.3% NaNO$_3$, 0.05% MgSO$_4$, 0.001% ferrous sulfate, and 1/30 mol phosphate buffer of Sorensen (pH 5.6) was inoculated with 800 ml. of an agitated culture of Metarrhizium anisopliae. The culture is grown under agitation and strong aeration, and after 24 hours there is added to it 5 g. 6α,16-dimethyl-4,15-pregnadiene-17α-ol-3,20-dione in 40 ml. dimethylformamide. The hydroxylation is followed by chromatography. After the reaction is completed, the mixture is extracted with chloroform. After evaporation of the solvent and recrystallization from acetone, the following substance was obtained: 6α,16-dimethyl-4,15-pregnadiene-11α,17α-diol-3,20-dione.

$\lambda_{max}$. 242 m$\mu$, $E_{1\ cm.}^{1\%}$ 412

(c) 9.2 g. 6α,16-dimethyl-4,15-pregnadiene-11α,17α-diol-3,20-dione are dried and then dissolved in 40 ml. chloroform and 55 ml. pyridine. The solution is then cooled with ice and reacted with 11.2 g. p-toluene sulfonyl chloride during continuous agitation. The reaction mixture is allowed to stand over night, is mixed with water, is extracted with chloroform, and prepared in the usual manner. The 11-tosylate is crystallized from the chloroform solution and is recrystallized from methanol.

11 g. of this tosylate are heated 30 minutes under a reflux condenser with 125 ml. glacial acetic acid and 10.3 g. anhydrous sodium acetate. The reaction mixture is mixed with water; the precipitated 6α,16-dimethyl-4,9-(11),15-pregnatriene 17α-ol-3,20-dione is filtered with suction and recrystallized from ethyl acetate.

$\lambda_{max}$. 238 m$\mu$, $E_{1\ cm.}^{1\%}$ 530

(d) 6.5 g. 6α,16-dimethyl-4,9(11)-15-pregnatriene-17α-ol-3,20-dione are dissolved in 250 ml. dioxane and 27.2 ml. water, and then reacted with 4.45 g. 98.3% N-bromosuccinimide and 1.75 ml. 70% by weight perchloric acid. After completion of the reaction, the material is mixed with water, filtered with suction, washed with water and dried. The intermediate thereby formed is 9α-bromo-6α-dimethyl-4,15-pregnadiene-11β,17α-diol-3,20-dione, and without further purification it is further reacted.

(e) 9.8 g. crude 9α-bromo-6α,16-dimethyl-4,15-pregnadiene-11β,17α-dion-3,20-dione are heated 2 hours under reflux with 20 g. potassium acetate and 550 ml. of absolute ethanol. The mixture is diluted with water and thoroughly extracted with chloroform. The chloroform extract is washed with water, dried of water, evaporated down, and recrystallized from methanol. There is recovered 9β,11β-oxido-6α,16-dimethyl-4,15-pregnadiene-17α-ol-3,20-dione.

$\lambda_{max}$. 243, 5 m$\mu$, $E_{1\ cm.}^{1\%}$ 480

(f) 6 g. 6α,16-dimethyl-9β,11β-oxido-4,15-pregnadiene-17α-ol-3,20-dione are suspended in 30 ml. methanol containing 0.6 g. anhydrous CaCl$_2$ and reacted with 3 g. CaO. Within 30 minutes, 9 g. iodine in 30 ml. methanol containing 0.6 g. anhydrous CaCl$_2$ are added dropwise while the temperature is kept at 25–28° C. The mixture is agitated another 30 minutes, cooled to 0° C., and mixed with 150 ml. ice water and 4.5 ml. glacial acetic acid. The precipitated iodide is washed, filtered with suction, and dried at 50° C.

The product thus obtained is dissolved at 40° C. in 100 ml. acetone containing 1 ml. water, 0.5 ml. glacial acetic acid, and 20 g. potassium acetate. It is then boiled 2 hours under a reflux condenser and then 1.5 liters ice water are stirred in. The precipitate is vacuum filtered, and washed with 200 ml. water. The moist product is dissolved in 120 ml. hot methanol. A solution of 3.1 g. sodium pyrosulfite in 45 ml. water is heated to boiling and is added to the methanol solution. The mixture is then heated 2 hours under a reflux condenser. 35 ml. are then distilled off, whereupon the 21-acetoxy compound crystallizes out. After being filtered and dried, the pure 6α,16-dimethyl-9β,11β-oxido-4,15 - pregnadiene - 17α,21-diol-3,20-dione-21-acetate is obtained by recrystallization from ethyl acetate.

$\lambda_{max}$. 243 m$\mu$, $E_{1\ cm.}^{1\%}$ 430

(g) 5.45 g. 6α,16-dimethyl-9β,11β-oxido-4,15-pregnadiene-17α,21-diol-3,20-dione-21-acetate are dissolved in 55 ml. absolute chloroform, and to this solution is then added a mixture of 52 ml. tetrahydrofuran, 20 ml. chloroform and 32 ml. hydrogen fluoride. This reaction mixture is allowed to stand 6 hours at −20° C. and is then poured into a sodium bicarbonate solution.

The precipitated 6α,16-dimethyl-9α-fluoro-4,15-pregnadiene-11β,17α,21-triol-3,20-dione-21-acetate is extracted with chloroform. The extracts are washed to neutral, dried and evaporated down. The residue thus obtained is recrystallized from methanol.

$\lambda_{max}$. 239.5 m$\mu$, $E_{1\ cm.}^{1\%}$ 403

(h) 1.0 g. 6α,16-dimethyl-9α-fluoro-4,15-pregnadiene-11β,17α,21-triol-3,20-dione-21-acetate are dissolved hot in 25 ml. methanol. 0.36 g. sodium bicarbonate in 5 ml. water is then added and the solution heated 10 minutes to boiling. About 300 ml. water are then added. The crude saponified product is vacuum filtered and is recrystallized from a mixture of chloroform and methanol. The pure 6α,16-dimethyl-9α-fluoro-4,15 - pregnadiene - 11β,17α,21-triol-3,20-dione thus obtained shows an UV-maximum at 239 m$\mu$, $E_{1\ cm.}^{1\%}$ 425

(i) A 10 liter fermentation vessel containing a nutrient solution of 0.1% "Basamin Bush" which is buffered with a Sorensen phosphate buffer at pH 6.8 is inoculated with an agitated culture of Corynebacterium simplex. The culture is allowed to grow at 28° C. After 16 hours, into the fermentation solution are introduced 5 g. 9α-fluoro-6α,16-dimethyl-4,15-pregnadiene-11β,17α,21-triol-3,20-dione in 200 ml. methanol. After 14 hours, none of the initial material could be detected by chromatography. The culture solution is extracted three times with chloroform, each time with 10 liters. The combined extracts are concentrated and the residue recrystallized from ethyl acetate, thereby producing pure 9α-fluoro-6α,16-dimethyl-1,4,15-pregnatriene-11β,17α,21-triol-3,20-dione.

$\lambda_{max}$. 239 m$\mu$, $E_{1\ cm.}^{1\%}$ 410

*Example 2*

(a) A 10 liter experimental fermenter containing a nutrient solution of 3% malt extract, 0.5% glucose and 0.3% peptone from casein is inoculated with 500 ml. of a spore suspension of Curvularia lunata. The fungus grows under strong aeration and agitation at 28° C., and after 24 hours, is inoculated with 5 g. 6α,16-dimethyl-4,15-pregnadiene-17α-ol-3,20-dione in 200 ml. methanol. The conversion is watched by chromatography. After 30 hours, no more of the initial material is discernible. The culture is extracted three times with chloroform, each time with 10 liters. The combined extracts are concentrated, and passed through a small column of activated silica gel. After recrystallization from vacuum, pure 6α,16-dimethyl-4,15-pregnadiene-11β,17α-diol-3,20-dione is obtained.

$\lambda_{max}$. 242 m$\mu$, $E_{1\ cm.}^{1\%}$ 432

(b) In a small fermenter, 12 liters of a nutrient solution of 1% yeast extract (pH 6.8) is inoculated with 0.5 liter of an agitated culture of Bacillus sphaericus. The culture is grown at 28° C. under strong aeration and stirring. After 9 hours, there are added 6 g. 6α,16-dimethyl-4,15-pregnadiene-11β,17α-diol-3,20-dione in 200 ml.

methanol. The dehydrogenation is watched by chromatography and after 25–30 hours it is completed. The fermentation mixture is extracted three times with chloroform, each time with 12 liters. The combined extracts are evaporated off, and the residue digested with petroleum ether, followed by recrystallization from acetone. Pure $6\alpha,16$-dimethyl-1,4,15-pregnatriene - $11\beta,17\alpha$ - diol - 3,20-dione is obtained.

$\lambda_{max.}$ 243 m$\mu$, $E_{1\,cm.}^{1\%}$ 405

(c) A suspension of 6.5 g. $6\alpha,16$-dimethyl-1,4,15-pregnatriene-$11\beta,17\alpha$-diol-3,20-dione in 98 ml. tetrahydrofuran and 69 ml. methanol are reacted in intervals up to 3 hours with 9.8 g. iodine and 9.8 g. calcium oxide. Thereafter, 2 liters ice water containing 32 ml. glacial acetic acid are added to the mixture, and the precipitate is filtered with suction and dried.

The 11 g. of crude 21-iodide thus obtained are dissolved in 550 ml. acetone and boiled 20 hours with 33 g. potassium acetate under a reflux condenser. The acetone is then vaporized under reduced pressure and the remaining mixture diluted with water. The precipitate is filtered with suction, and while still moist is mixed with 130 ml. methanol, 3.25 g. sodium pyrosulfite and 48.5 ml. water, and is boiled 2 hours under a reflux condenser. After being cooled, the reaction mixture is diluted with water and the precipitate filtered with suction, dried, and recrystallized from acetone/ether. It consists of $6\alpha,16$-dimethyl-1,4,15-pregnatriene-$11\beta,17\alpha,21$-triol - 3,20 - dione-21-acetate. $\gamma_{max.}$ 241 m$\mu$, M.P. 255–257° C.; $(\alpha)_D+32°$ in chloroform.

(d) 2 g. $6\alpha,16$-dimethyl-1,4,15-pregnatriene-$11\beta,17\alpha$-21-triol-3,20-dione are dissolved in 10 ml. pyridine and reacted with 0.36 g. acetic anhydride. After being allowed to stand 15 hours at room temperature, the reaction mixture is poured into water, is extracted three times with chloroform, the chloroform solution neutralized by shaking with sodium bicarbonate solution and then dried and then evaporated in a vacuum. The amorphous residue of $6\alpha,16$-dimethyl-1,4,15-pregnadiene-$11\beta,17\alpha,21$-triol-3,20-dione-21-acetate is dissolved in 70 ml. acetone and is reacted under constant agitation at 10° C. with 1.5 ml. of an oxidizing solution, added drop-by-drop. (The oxidizing solution is prepared by dissolving 5 g. chromium trioxide in 4.4 ml. concentrated sulfuric acid, and adding water to make a total volume of 20 ml.) The reaction mixture is stirred 30 minutes at room temperature with chloroform and water. The neutral washed and dried chloroform solution is evaporated under reduced pressure to dryness. The residue after recrystallization from methanol consists of $6\alpha,16$-dimethyl-1,4,15-pregnatriene-$17\alpha$, 21-diol-3,11,20-trione-21-acetate.

$\lambda_{max.}$ 240 m$\mu$, $E_{1\,cm.}^{1\%}$ 367

M.P. 244–246° C.; $(\alpha)_D+112°$ in chloroform.

*Example 3*

(a) 4.6 g. $6\alpha,16$-dimethyl-4,15-pregnadiene-$17\alpha$-ol-3, 20-dione are dissolved in a mixture of 10 ml. tetrahydrofuran and 12 ml. methanol and reacted with 7.3 g. iodine at 0° C. with stirring. Within 1 hour, a 10% aqueous solution of sodium hydroxide is added dropwise until the color of the iodine disappears. After another hour, the reaction mixture is poured into water, the resinous precipitate dissolved in ether, the ether solutions washed with water, dried with sodium sulfate, and the ether evaporated in a vacuum at room temperature. The crude 21-iodide compound is heated 24 hours under reflux with 300 ml. acetone and 13.5 g. anhydrous potassium acetate. The reaction mixture is then evaporated to small volume and reacted with water. The separated $6\alpha,16$-dimethyl-4,15-pregnadiene-$17\alpha,21$-diol-3,20-dione-21-acetate is filtered by suction and recrystallized from acetone and methanol.

$\lambda_{max.}$ 240 m$\mu$, $E_{1\,cm.}^{1\%}$ 412

M.P. 226–228° C.; $(\alpha)_D+40.7°$ in chloroform.

(b) In a small fermenter, 15 liters of a nutrient solution of 5% malt extract, 1% sucrose, 0.2% sodium nitrate, 0.1% dipotassium phosphate, 0.05% magnesium sulfate, 0.05% potassium chloride and 0.005% ferrous sulfate is adjusted to a pH of 7.0 and is inoculated with 800 ml. of an agitated culture of *Curvularia lunata* (Wakker) Boedijn and is incubated at 28° C. with strong aeration and under agitation. After 24 hours of growing, 5 g. $6\alpha,16$ - dimethyl-4,15-pregnadiene-$17\alpha,21$-diol-3,20-dione or its 21-acetate in 40 ml. dimethylformamide are added. The reaction is watched by chromatography. After no more of the initial material can be detected, the culture solution is extracted three times with the same volume of chloroform. The combined chloroform extracts are evaporated down and the residue chromatographed through silica gel. The eluate obtained with chloroform and ethyl acetate (1:3) contains $6\alpha,16$-dimethyl-4,15-pregnadiene-$11\beta,17\alpha,21$-triol-3,20-dione which is recrystallized from acetone/ether.

$\lambda_{max.}$ 241 m$\mu$, $E_{1\,cm.}^{1\%}$ 412

M.P. 238–240° C.; $(\alpha)_D+45°$ in ethanol.

(c) 10 g. $6\alpha,16$-dimethyl-4,15-pregnadiene-$11\beta,17\alpha,21$-triol-3,20-dione-21-acetate are boiled with 7 g. chloranil in 300 ml. ethyl acetate 10 hours under reflux. The reaction mixture is cooled, poured into water, and extracted with chloroform. The extract is washed with water and then with sodium bicarbonate solution until all of the acetic acid is removed. It is then again washed with water, agitated with 225 ml. of a 1% NaOH solution, again washed with water, and dried with sodium sulfate. After being concentrated it is crystallized from ethyl acetate as 6,16 - dimethyl-4,6,15-pregnatriene-$11\beta,17\alpha,21$-triol-3, 20-dione-21-acetate.

$\lambda_{max.}$ 288 m$\mu$, $E_{1\,cm.}^{1\%}$ 567

M.P. 201–202° C.; $(\alpha)_D+111°$ in dioxane.

($d_1$) In a small fermenter, 16 liters of a nutrient solution of 1% yeast extract, pH 6.8, is inoculated with 0.5 liter of an agitated culture of *Bacillus sphaericus*. The culture is grown at 28° C. with strong aeration and constant stirring and after about 10 hours has added to it a solution of 300 ml. methanol containing 7.5 g. 6,16-dimethyl - 4,6,15-pregnatriene-$11\beta,17\alpha,21$-triol-3,20-dione-21-acetate. The dehydrogenation is watched by paper chromatography and is completed after 28 to 36 hours. The culture solution is extracted three times with the same volume of chloroform, and the combined chloroform solutions are evaporated down. By crystallization from acetone, there is obtained 6,16-dimethyl-1,4,6,15-pregnatetraene-$11\beta,17\alpha,21$-triol-3,20-dione.

$\lambda_{max.}$ 227, 254, 304 m$\mu$, $E_{1\,cm.}^{1\%}$ 402, 260, 332

M.P. 251–253° C.; $(\alpha)_D+2°$ in dioxane.

($d_2$) 5 g. $6\alpha,16$-dimethyl-4,6,15-pregnatriene-$11\beta,17\alpha$, 21-triol-3,20-dione-21-acetate are boiled under reflux 20 hours with 4.8 g. 2,3-dichloro-5,6-dicyano-p-benzoquinone in 75 ml. dioxane. Thereafter the reaction mixture is diluted with chloroform and is shaken successively with water, sodium bicarbonate solution and again with water. The chloroform solution is dried and evaporated down. From the residue there crystallizes out 6,16-dimethyl - 1,4,6,15-pregnatetraene-$11\beta,17\alpha,21$-triol-3,20-dione-21-acetate which can be purified by recrystallization from methanol.

$\lambda_{max.}$ 227, 254, 304 m$\mu$, $E_{1\,cm.}^{1\%}$ 370, 240, 307

(e) 5.8 g. $6\alpha,16$-dimethyl-1,4,6,15-pregnatetraene-$11\beta$, $17\alpha,21$-triol-3,20-dione-21-acetate are dissolved in 160 ml. methanol, and after the addition of a hot solution of 1.28 g. sodium bicarbonate in 19 ml. water, are boiled 14 minutes under reflux. The cooled mixture is stirred with 900 ml. water containing 3 ml. glacial acetic acid and is extracted with chloroform. The combined chloroform extracts are washed with water and evaporated under reduced pressure. The residue is recrystallized from methanol, giving colorless crystals of 6,16-dimethyl-1,4,6,15-pregnatetraene-11β,17α,21-triol-3,20-dione.

$\lambda_{max.}$ 227, 254, 304 m$\mu$, $E_{1\,cm.}^{1\%}$ 402, 260, 332

M.P. 251–253° C.; $(\alpha)_D$ +2° in dioxane.

Example 4

(a) 3 g. 6α,16-dimethyl-4,15-pregnadiene-11β,17α,21-triol-3,20-dione-21-acetate are dissolved in 90 ml. dioxane, and after the addition of 2.1 g. chloranil are boiled 7 hours under reflux. The light brown solution is cooled and poured into water, is agitated with chloroform, then with water, then with 210 ml. of a N/10 NaOH solution, and finally with water. The chloroform solution is then dried with sodium sulfate and the chloroform distilled off. The residue after recrystallization from methanol consists of 6,16 - dimethyl-4,6,15-pregnatriene-11β,17α,21-triol-3,20-dione-21-acetate.

$\lambda_{max.}$ 287.5 m$\mu$, $E_{1\,cm.}^{1\%}$ 560

M.P. 200–201° C.; $(\alpha)_D$ +110° in dioxane.

(b) 2.5 g. 6α,16-dimethyl-4,6,15-pregnatriene-11β,17α,21-triol-3,20-dione-21-acetate are dissolved in 300 ml. pyridine, reacted with 4.25 ml. thionyl chloride, and heated 30 minutes to 100° C. The reaction mixture is then poured into water and the precipitate suction filtered, washed, and dried. The product after recrystallization from ethyl acetate consists of 6,16-dimethyl-4,6,9(11),15-pregnatetraene - 17α,21-diol-3,20-dione-21-acetate. $\lambda_{max.}$ 283 m$\mu$.

(c) By a method similar to Example 1d, 6,16-dimethyl-4,6,9(11),15 - pregnatetraene - 17α,21-diol-3,20-dione-21-acetate is converted into 6,16-dimethyl-9α-bromo-4,6,9(11),15 - pregnatetraene - 11β,17α,21-triol-3,20-dione-21-acetate which by treatment with potassium acetate as in Example 1e is converted into 6,16-dimethyl-9β,11β-oxido-4,6,15 - pregnatriene - 17α,21-diol-3,20-dione-21-acetate. $\lambda_{max.}$ 289 m$\mu$.

(d) 2.42 g. 6.16 - dimethyl - 9β-oxido-4,6,15-pregnatriene-17α,21-diol-3,20-dione-21-acetate are dissolved in 25 ml. absolute chloroform and while at 50° C. are added to 14.5 ml. of a mixture of 27 ml. tetrahydrofuran, 8.7 ml. chloroform and 14.5 g. hydrofluoric acid. The reaction mixture is allowed to remain 8 hours at 0° C., and is then poured into a sodium carbonate solution. The steroid is extracted with chloroform, and the chloroform solution is dried and evaporated. The residue consists of 6,16 - dimethyl-9α-fluoro-4,6,15-pregnatriene-11β,17α,21-triol-3,20-dione-21-acetate and is recrystallized from acetone. $\lambda_{max.}$ 285 m$\mu$.

(e) In a small fermenter, 15 liters of a nutrient solution of 1% yeast extract of pH 6.8 is inoculated with 0.5 liter of an agitated culture of Bacillus sphaericus. The culture is grown under strong aeration and constant agitation at 28° C. and after about 10 hours has added to it 7.5 g. 9α-fluoro-6,16-dimethyl-4,6,15-pregnatriene-11β,17α,21-triol-3,20-dione dissolved in 300 ml. methanol. The dehydrogenation is watched by paper chromatography and is complete after 36 hours. The culture solution is extracted three times with equal volumes of chloroform and the combined chloroform solutions are evaporated. The residue is recrystallized from acetone and consists of 9α - fluoro-6,16-dimethyl-1,4,6,15-pregnatetraene-11β,17α,21-triol-3,20-dione.

Example 5

5 g. 6α,16-dimethyl - 1,4,15 - pregnatriene-11β,17α,21-triol-3,20-dione are dissolved in 120 ml. absolute dioxane, reacted wtih 1.55 ml. chloroacetyl chloride and 1.5 ml. pyridine, and are allowed to stand overnight at room temperature. The reaction mixture is poured into water, the precipitate is filtered with suction, washed with water and dried. The crude 6α,16-dimethyl-1,4,15-pregnatriene-11β,17α,21-triol-3,20-dione-21-chloracetate thus obtained is dissolved in 400 ml. acetone and after adding 55 ml. diethylamine and 4 ml. water, it is allowed to stand overnight. The reaction mixture is concentrated in vacuum at 20° C., during which 6α,16-dimethyl-1,4,15-pregnatriene-11β,17α,21-triol-3,20-dione-21 - diethylaminoacetate crystallizes out.

$\lambda_{max.}$ 242.5 m$\mu$, $E_{1\,cm.}^{1\%}$ 400

0.7 g. of this diethylaminoacetate is dissolved in 17 ml. absolute tetrahydrofuran and is reacted with 15 ml. chloroform saturated with HCl. A precipitate of 6α,16-dimethyl - 1,4,15 - pregnatriene - 11β,17α,21-triol-3,20-dione-21-diethylaminoacetate hydrochloride is formed, which is washed with tetrahydrofuran and then dried.

Example 6

10 g. 6α,16-dimethyl-1,4,6,15-pregnatetraene-11β,17α,21-triol-3,20-dione are mixed with 20 cc. absolute pyridine and 9.3 g. dimorpholido phosphoryl chloride

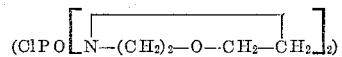

$(ClPO[N-(CH_2)_2-O-CH_2-CH_2]_2)$ and allowed to remain 10 days in a closed container. The reaction mixture is poured into the calculated amount of dilute sulfuric acid and the 21-dimorpholide phosphate is extracted with chloroform.

The residue from the chloroform solution is dissolved in 40 ml. ethanol, and water is then added until the first permanent turbidity appears. 110 g. of a sulfonic acid cation-exchange resin are then added, and the mixture is agitated 36 hours. The material is then filtered, the ion-exchange resin washed with ethanol, the filtrate neutralized with sodium hydroxide and highly concentrated under reduced pressure. After cooling, the concentrate is extracted with butanol. The extract is dried with sodium sulfate, neutralized with sodium methylate, and evaporated down. The sodium salt crystallizes out upon cooling. It is filtered off, extracted while hot with methanol, the extract reacted with butanol, and highly concentrated, producing a precipitate of the sodium salt of pure 6α,16-dimethyl - 1,4,6,15 - pregnatetraene-11β,17α,21-triol-3,20-dione-21-orthophosphate.

Example 7

0.5 g. 9α-fluoro-6,16-dimethyl-1,4,15-pregnatriene-11β,17α,21-triol-3,20-dione are dissolved in 10 ml. absolute chloroform and 3 ml. absolute pyridine, and are reacted 5 minutes at 0° C. during continual stirring with a solution of 0.5 ml. tertiary-butylacetic acid chloride in 5 ml. chloroform. The mixture is stirred another 5 minutes while being cooled with ice, and then 4 hours more at room temperature. The reaction mixture is poured upon ice and is extracted with chloroform. The extract is washed with dilute sulfuric acid and then with a sodium bicarbonate solution, and is then dried and evaporated down. The residue in the chloroform is filtered over 10 g. "Florisil" and is evaporated to dryness. It is crystallized from methanol to produce the pure tertiary-butyl acetate.

The following are preferred embodiments of the pharmaceutical compositions of this invention.

I. Tablets:
   Each tablet contains—
      6α,16-dimethyl-9α-fluoro-15-dehydro-prednisolone _____ mg__ 5
      Lactose _____ mg__ 120
      Starch _____ mg__ 15
      Magnesium stearate_____ mg__ 2
      Talc _____ mg__ 10

II. Tablets:
   Each tablet contains—
      6α,16-dimethyl-15-dehydro-prednisone _____ mg__ 6
      Lactose _____ mg__ 80
      Corn starch_____ mg__ 10
      Talc _____ mg__ 10

III. Aqueous suspension:
   Each ampoule contains—
   6α,16-dimethyl-15-dehydro-prednisolone mg— 10
   Sodium chloride _____ mg— 7
   Carboxymethyl cellulose _____ 2
   Methyl ester of parahydroxy benzoic acid mg— 0.65
   Propyl ester of parahydroxy benzoic acid mg— 0.35
   Phenol _____ mg— 3
   Water, ad 1 ml.

IV. Ointment:
   6,16 - dimethyl-6,15-bisdehydro-hydrocortisone _____ g— 0.5
   Wool wax alcohols _____ g— 6
   Yellow petroleum jelly _____ g— 20
   Solid paraffine _____ g— 15
   Viscous paraffine _____ g— 58

V. Aqueous solution:
   Each ampoule contains—
   Sodium salt of 6,16-dimethyl-6,15-disdehydro-prednisolone-succinate _____ mg— 20
   Propyleneglycol _____ mg— 100
   Aqua dest., ad 1 ml.
   And citrate buffer solution to maintain a pH of 6.4.

VI. Tablets:
   Each tablet contains—
   6,16 - dimethyl-9α-fluoro-6,15-bisdehydro-prednisolone _____ mg— 4
   Starch _____ mg— 20
   Lactose _____ mg— 100
   Talc _____ mg— 10

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly equitably, and intended to be, within the full range of equivalence of the following claims.

What is claimed is:

1. A member of the group consisting of a compound of the formula:

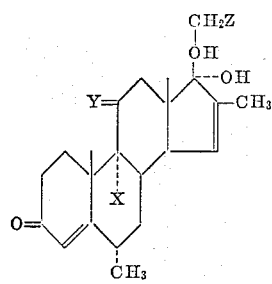

and the $\Delta^1$, $\Delta^6$, and $\Delta^{1,6}$ derivatives thereof, wherein

X represents a member selected from the group consisting of H and F;
Y represents a member selected from the group consisting of αH, βOH and =O; and
Z represents a member selected from the group consisting of a free and esterified hydroxyl group.

2. 6α,16-dimethyl-15-dehydro-hydrocortisone.
3. 6α,16-dimethyl-15-dehydro-prednisolone.
4. 6α,16-dimethyl-15-dehydro-prednisone.
5. 6α,16-dimethyl-9α-fluoro-15-dehydro-prednisolone.
6. 6,16-dimethyl-6,15-bisdehydro-hydrocortisone.
7. 6,16-dimethyl-6,15-bisdehydro-prednisolone.
8. 6,16-dimethyl-6,15-bisdehydro-prednisone.
9. 6,16-dimethyl - 9α - fluoro - 6,15 - bisdehydro-prednisolone.

10. A pharmaceutical composition in unit dosage form comprising 0.1 to 25 mg. of a compound selected from the group consisting of compounds of the formula

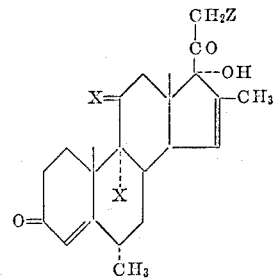

and the $\Delta^1$, $\Delta^6$, and $\Delta^{1,6}$ derivatives thereof, wherein

X represents a member selected from the group consisting of H and F;
Y represents a member selected from the group consisting of αH, βOH and =O; and
Z represents a member selected from the group consisting of a free and esterified hydroxyl group;
and an inert carrier.

11. A compound selected from the group consisting of 6α,16-dimethyl-4,15-pregnadiene - 3,20 - dione-17α,21-diol and the 21-acetate thereof.

12. 6α,16-dimethyl - 4,9(11),15 - pregnatriene-3,20-dione-17α-ol.

13. A compound selected from the group consisting of 6,16-dimethyl-4,6,9(11),15-pregnatetraene-3,20-dione-17α,21-diol and the 21-acetate thereof.

14. A compound selected from the group consisting of 6α,16-dimethyl-9β,11β-oxido-4,15-pregnadiene-17α,21-diol-3,20-dione and the 21-acetate thereof.

15. 6,16-dimethyl - 9β,11β - oxido-4,6,15-pregnatriene-3,20-dione-17α-ol.

16. 6α,16-dimethyl - 4,15 - pregnadiene-17α-ol-3,20-dione.

17. 6α,16-dimethyl - 4,15 - pregnadiene - 11α,17α - diol-3,20-dione.

18. 6α,16-dimethyl - 4,15 - pregnadiene - 11β,17α - diol-3,20-dione.

No references cited.

UNITED STATES PATENT OFFICE
CERTIFICATE OF CORRECTION

Patent No. 3,118,814                      January 21, 1964

Fritz von Werder et al.

It is hereby certified that error appears in the above numbered patent requiring correction and that the said Letters Patent should read as corrected below.

Column 1, line 72, for "sterate" read -- stearate --; same line 72, after "petroleum" strike out the comma; column 3, line 17, for "Collectotrichum" read -- Colletotrichum --; line 18, for "Septomyca" read -- Septomyxa --; column 4, line 37, for "phenoxybutric" read -- phenoxybutyric --; line 40, after "acids" insert a comma; column 5, line 47, for "-6α-" read -- -6α,16- --; line 51, for "-11β,17α-dion-" read -- 11β,17α-diol- --; column 6, line 67, for "vacuum" read -- acetone --; column 7, line 40, for "-pregnadiene-" read -- -pregnatriene- --; column 9, line 23, for "pyrydine" read -- pyridine --; lines 32 and 33, for "-4,6,9(11),15-pregnatetraene-" read -- -4,6,15-pregnatriene- --; line 38, for "-9β-oxido-" read -- -9β,11β-oxido- --; column 11, lines 47 to 57, for that portion of the formula reading

column 12, lines 20 to 30, for that portion of the formula reading "X=" read -- Y= --.

Signed and sealed this 16th day of June 1964.

(SEAL)
Attest:

ERNEST W. SWIDER                      EDWARD J. BRENNER
Attesting Officer                  Commissioner of Patents